UNITED STATES PATENT OFFICE.

LOUIS N. SAHM, OF NEW YORK, N. Y.

DYE OR STAIN.

1,016,295.  Specification of Letters Patent.  Patented Feb. 6, 1912.

No Drawing.  Application filed November 4, 1911.  Serial No. 658,522.

*To all whom it may concern:*

Be it known that I, LOUIS N. SAHM, a citizen of the United States, and a resident of the borough of Manhattan, city, county, and State of New York, have invented a certain new and useful Dye or Stain, of which the following is a full, clear, and exact description.

My new material is especially intended for coloring carpets, rugs and similar textile fabrics. It may, however, be beneficially used for coloring leather, wood, paper and similar absorbent material.

I compound my material as follows: An alcoholic solution is made of any suitable basic coloring material, (those preferred are specified below), with tannic acid, shellac, and a sufficient amount of acetic acid. I prefer to make the solution as follows: Dissolve the shellac and color in one half the amount of alcohol; then dissolve the tannic acid and the acetic acid in the remaining half of the alcohol; then mix the two together and the product will be ready for use. If the material to be dyed or stained be fine in texture, as for example, portières, curtains and the like, I prefer to strain the product before use. This is not essential, however, and for all ordinary uses, no advantage results from straining.

The material may be applied to the article with a brush, or as a spray, or by dipping, as preferred, and upon evaporation of the alcohol and acetic acid, a so-called lake pigment is formed and embedded in the fabric.

The alcohol and the acetic acid in my compound serve as the solvent materials, the shellac aids in binding the lake pigment to the fiber, and the tannic acid combined with the color makes the lake pigment and also serves to make the color faster to light. The material is waterproof and cannot be washed away except by the use of strong soaps or similar solvent material. It quickly and efficiently dyes all textile fiber, animal as well as vegetable, also leather, wood, paper and all similar absorbent natural or artificial materials.

The ingredients which I prefer are as follows:

Alcohols: Wood alcohol, or 95 per cent. grain spirit, or denatured alcohol.

Tannic acid: The ordinary commercial article, or tannin bearing substances may be suitably treated to extract the tannin therefrom. The strength of the extract however should be equal to that of ordinary good grade tannin of commerce.

Shellac: The ordinary shellac of commerce, but other soluble resinous substances may be substituted therefor, such as pine rosin, sandarach or mastic.

Acetic acid: An ordinary good grade commercial article.

Coloring matters: Those products known commercially as brilliant green, malachite green, auramin, phosphin, rhodamin, methylene blue (zinc free), Victoria blue, Bismarck brown, chrysoidin, methyl violet, or the base color of any of the above products rendered soluble with acid. Other basic colors than those above specified as the preferred ones may be employed.

A formula which I have found useful, although the proportions are not at all arbitrary, and may be varied to suit special needs or uses, as those familiar with this general art will readily understand, is as follows: Alcohol, 94 parts, tannic acid, 2 parts, shellac, 2 parts, basic color or a mixture of basic colors, 1 part, acetic acid, 1 part.

The dyeing or staining of the article to be treated is an extremely simple matter, since it is all done at one operation and no subsequent treatment is necessary; when the article is thoroughly dry, the process is finished; and, as stated above, the material may be applied by a brush, or by spraying, or by dipping, or in any other preferred manner.

I claim:

A dyeing or staining compound comprising alcohol, acetic acid, tannin, shellac and coloring matter, as described and in approximately the proportions stated.

In testimony whereof I have signed my name to this specification in the presence of two subscribing witnesses.

LOUIS N. SAHM.

Witnesses:
 WM. J. ROBERTSON,
 EDWIN F. VALENTINE.